US011423061B2

(12) United States Patent
Cabra et al.

(10) Patent No.: US 11,423,061 B2
(45) Date of Patent: Aug. 23, 2022

(54) TILE SERVER

(71) Applicant: MARITECH DEVELOPMENT LIMITED, London (GB)

(72) Inventors: Miguel Angel Cabra, London (GB); Ashley Benjamin Hanks, London (GB); Michail Gaziotis, London (GB); Laurence Blake, London (GB); Richard White, London (GB); Eliad Perpinyal, London (GB); Jamie Mark Shedley, London (GB)

(73) Assignee: MARITECH DEVELOPMENT LIMITED, London (GB)

( * ) Notice: Subject to any disclaimer, the term of this patent is extended or adjusted under 35 U.S.C. 154(b) by 187 days.

(21) Appl. No.: 16/562,390

(22) Filed: Sep. 5, 2019

(65) Prior Publication Data
US 2020/0089694 A1    Mar. 19, 2020

(30) Foreign Application Priority Data

Sep. 6, 2018 (GB) ..................................... 1814549

(51) Int. Cl.
*G06F 16/29* (2019.01)
*G06F 16/954* (2019.01)
(Continued)

(52) U.S. Cl.
CPC ............ *G06F 16/29* (2019.01); *G06F 16/954* (2019.01); *G06F 16/9574* (2019.01);
(Continued)

(58) Field of Classification Search
CPC ....... G06T 15/04; G06T 17/05; G09B 29/006; G09B 29/007; G06F 16/9574; G06F 16/954; G06F 16/29; G01C 21/203
(Continued)

(56) References Cited

U.S. PATENT DOCUMENTS

2008/0174593 A1   7/2008  Ham
2008/0238941 A1   10/2008 Kinnan
(Continued)

OTHER PUBLICATIONS

UK-IPO, Combined Search Report and Examination Report under Sections 17 and 18(3) for related GB Application No. GB 1814549.0, dated Mar. 8, 2019, 8 pages.
(Continued)

*Primary Examiner* — Kuen S Lu
(74) *Attorney, Agent, or Firm* — Norton Rose Fulbright US LLP; Jason J. Novak; Noble C. Woo

(57) ABSTRACT

A method is disclosed herein which comprises receiving a user request for map information at a server. The method also comprises requesting one or more base map tiles from a remote server based on the user request, the request including zoom level information and tile position information. At the server, the request is normalised based on the zoom information and the tile position information. The method then comprises defining a map view area based on the normalised request, obtaining vessel data relating to a plurality of vessels, determining for each of the plurality of vessels if the vessel lies within the map view area, and creating a new map tile comprising the vessel data for the vessels determined to lie within the map view area. The method then comprises causing display of the user requested base map tiles and overlaying the new map tile at a user device.

15 Claims, 7 Drawing Sheets

(51) Int. Cl.
  *G06F 16/957* (2019.01)
  *G06T 17/05* (2011.01)
  *G06T 15/04* (2011.01)
  *G09B 29/00* (2006.01)

(52) U.S. Cl.
  CPC .............. *G06T 15/04* (2013.01); *G06T 17/05* (2013.01); *G09B 29/006* (2013.01)

(58) Field of Classification Search
  USPC ........................................................ 707/724
  See application file for complete search history.

(56) References Cited

U.S. PATENT DOCUMENTS

| 2009/0027418 | A1  | 1/2009  | Maru et al. |            |
|--------------|-----|---------|-------------|------------|
| 2013/0322702 | A1* | 12/2013 | Piemonte    | G06F 16/2291 |
|              |     |         |             | 382/113    |
| 2015/0170388 | A1* | 6/2015  | Chawathe    | G06T 11/60 |
|              |     |         |             | 345/629    |
| 2017/0118540 | A1* | 4/2017  | Thomas      | H04N 19/167 |

OTHER PUBLICATIONS

DeMeritt, M., "Tiles on a cloud," Aeronautical AIS Best Practices, ESRI, Jul. 2013, pp. 8-11, available at https://www.esri.com/library/bestpractices/aeronautical.pdf.

Hu, Qinyou, et al., "Bringing Live AIS Information on the web Sea charts by Using Ajax," Jul. 2007, pp. 1-15, available at https://www.researchgate.net/publication/4272205_Bringing_Live_AIS Information_on_the_Web_Sea_Charts_by_Using_Ajax.

Extended European Search Report dated Feb. 13, 2020 in European Patent Application No. 19196044.2 (8 pages).

Zissis Dimitrios, et al. "Design and development guidelines for real-time, geospatial mobile applications: lessons from 'MarineTraffic'" In International Conference on Mobile Web and Information Systems Aug. 26, 2013 (pp. 107-120). Springer, Berlin, Heidelberg.

* cited by examiner

TILE SERVER

CROSS-REFERENCE TO RELATED APPLICATION

The present application claims priority from Great Britain Patent Application No. 1814549.0, filed on Sep. 6, 2018, the entire content of which is incorporated herein by reference.

FIELD

The present invention relates to creating map information based on user requests. In particular it relates to map tiles which comprise vessel information.

BACKGROUND

With the increase in global connectivity, a rapid rise in the use of real-time mapping systems has taken place. End users are presently able to use mapping applications to determine whether a taxi is nearby, whether traffic systems are congested, and where "en route" a plane is located, and all of this may be achieved in near real-time. Users of a mapping service may request information relating to real-time data such as that for the positions and movements of vessels, for example.

Web-based mapping service users are able to request base map data from the mapping service with distinct characteristics according to the specific requirements of the user. This is generally achieved in known systems through a web-based application programming interface (API). In many cases, users wish to provide additional proprietary data to the base map data. This allows for a vast number of different applications in the field of data visualisation. The way in which this may be achieved through a web-based application is explained in below. In essence a user requests base map data, and then has the web-API call for additional data from a trusted source. The trusted source may be a web address. The API is generally called using scripts in the Javascript, XML or JavaScript Object Notation (JSON) programming formats. As an example, in order to create a map showing the locations of recent earthquakes, a script may be run which references data from the US geological survey via an http web address. An HTML script is used to call data from a remote source to return JSON data which are applied to the base map data as objects. In many cases the however there are situations in which the datasets being referenced are too large to be rendered within the website or devices API, and user experience is negatively impacted.

A method for providing map data is required that mitigates the problems outlined above.

SUMMARY

The present disclosure describes embodiments in which a user request for map data is treated by a map tile server. The map tile server is arranged so as to reduce the processing demands placed on web-based mapping applications accessed through a browser on a computing device. The provision of the server-based method above allows for the selection of the correct data to be visualised as a subset from all global data regarding a particular class of geospatial data. The application of the Tile server allows for "on-the-fly" calculation and rendering of objects within a requested viewport in a way not previously possible. The method and system described herein is particularly applicable to the rendering of vessel data which may be provided in Automatic Identification System (AIS) format. The method may be differently implemented depending on the user device upon which a map request is made, and this is described more fully below. The method may be used to create maps showing positional data, route density information for a plurality of selected vessels, and also voyage information for one or more vessels. Maps may also be created using historical vessel positions.

In accordance with an aspect of the disclosure there is provided a method, comprising, receiving a user request for map information at a server; requesting one or more base map tiles from a remote server based on the user request, the request including zoom level information and tile position information; at the server, normalising the request based on the zoom information and the tile position information; defining a map view area based on normalised request, obtaining vessel data relating to a plurality of vessels; determining for each of the plurality of vessels if the vessel lies within the map view area; creating a new map tile comprising the vessel data for the vessels determined to lie within the map view area; causing display of the user requested base map tiles and overlaying the new map tile at a user device.

Defining a map view area may further comprise providing the map view with an image buffer to create an extended map area.

The method may further comprise determining for each of the plurality of vessels if the vessel lies within the extended map area, and wherein the step of creating the new map tile includes vessel data for the vessels lying in the extended map area.

The method may further comprise removing the image buffer prior to causing display of the new map tile at the user device.

Determining if a vessel lies in the map area may include converting coordinate information into pixel information.

The vessel data may comprise latitude and longitude information, the method further comprising normalising the latitude and longitude information to correspond with the normalised base map tile data.

The method may further comprise, for the vessels determined to lie within the extended map area, normalising the respective vessel data to conform to the normalised request, and wherein the new map tile is created based on the normalised vessel data.

Normalising the vessel data may comprise converting latitude and longitude information to pixel data.

The image buffer may be based on the largest vessel in the map view. The image buffer may be based on the zoom level. The vessel data may comprise AIS data. Normalising the request may comprise converting zoom information and tile position information into world coordinates.

The vessel data may comprise comprising coordinate information.

The transparent image may comprise a density heat map.

According to another aspect, a computer readable medium comprising computer-executable instructions which, when executed by a processor, cause the processor to perform the method outlined in the claims.

BRIEF DESCRIPTION OF THE DRAWINGS

Exemplary embodiments of the disclosure shall now be described with reference to the drawings, in which.

Throughout the description and the drawings, like reference numerals refer to like parts.

SPECIFIC DESCRIPTION

Figure 1:
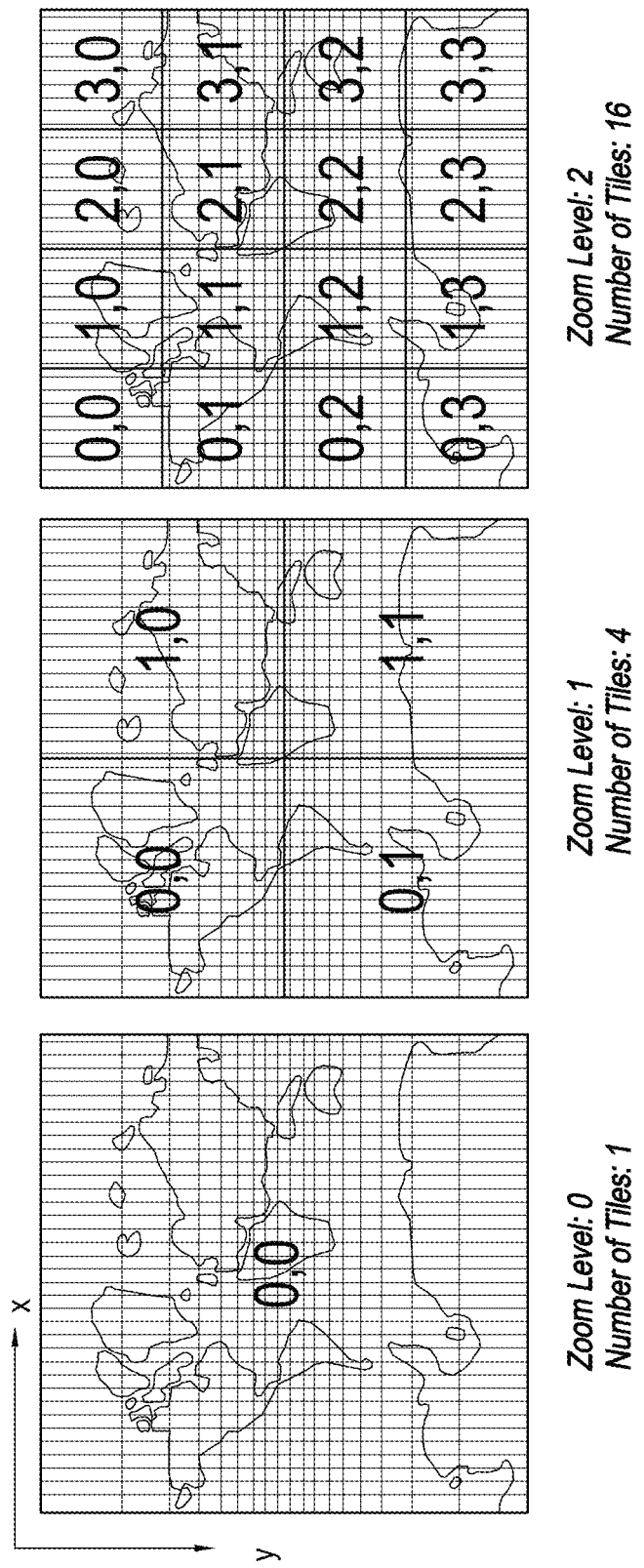
FIG. 1 is a schematic diagram showing a global map tiled at different zoom levels.

FIG. 1 is a schematic diagram showing a global map for use in computer implemented mapping scenarios. The diagram shows three different zoom levels, and the tiles required for each zoom level. The map shown in FIG. 1 is a global map based upon the Mercator projection. In this projection, as with all map projections, the shapes and sizes of land masses and oceans are distorted version of the true positions and sizes present on the surface of the Earth. This is inherent in the nature of attempting to represent a near spherical object on a flat planar map which is to be displayed on a two dimensional surface, which in modern contexts is usually the display of a computing device. When relating the pixel data present in a map image to the positional data which is displayed, there is therefore not a 1:1 relationship between pixel and coordinate data. This obviously has more serious implications at the lowest zoom level, in which a single square image can be used to display the whole of the Earth's surface. One pixel located at a latitude of 75 degrees from the equator represents a much larger area than a pixel located at the equator. The difference between relative sizes of Greenland and Australia on the projection and in reality are a good example of this. At high zoom levels, the projection of the Earth's surface onto a flat (usually rectangular) image can be carried out with relatively little distortion across the image.

As is known, a tile map is a map which is to be displayed on a computing device, usually in a browser, in which a number of requested image files are blended together to form a map view, or viewport. The advantage of using tiled web maps is that each time a user moves the view port to create a different view, or to follow a route beyond the borders of the presently displayed viewport, many of the partially visible tiles will still be required for viewing in the new or adjusted viewport, and so they do not have to be re-loaded or re-rendered, and only the new tiles need be fetched and displayed. This has obvious advantages over creating a single image map image for each viewport, which would require processing all of the data in the viewport for each movement or scaling change which is made by a user.

Referring to FIG. 1, at the lowest zoom (level 0), only one map tile is required to display the data for the whole of the earth, and this map tile is given a label (0,0). At a second zoom level, it can be seen that four map tiles are required to cover the whole earth. These map tiles are labelled from the north-western most point on the map (the top-left), with x values increasing from west to east (left to right) and y values increasing from north to south (top to bottom) on the map. Likewise, a further zoom level (level 2) is shown, in which it can be seen that sixteen tiles are required. The north-western most tile is still labelled (0,0) and the south-eastern most tile is labelled (3,3).

When a user of a computing device wishes to view a particular portion of the map data, a selection is made and a request is sent to a map provider for map tiles. Such a request contains an X,Y coordinate pair, and a Z value which indicates the zoom level. The Z component helps to know the number of tiles that composed the zoom level.

Figure 2:
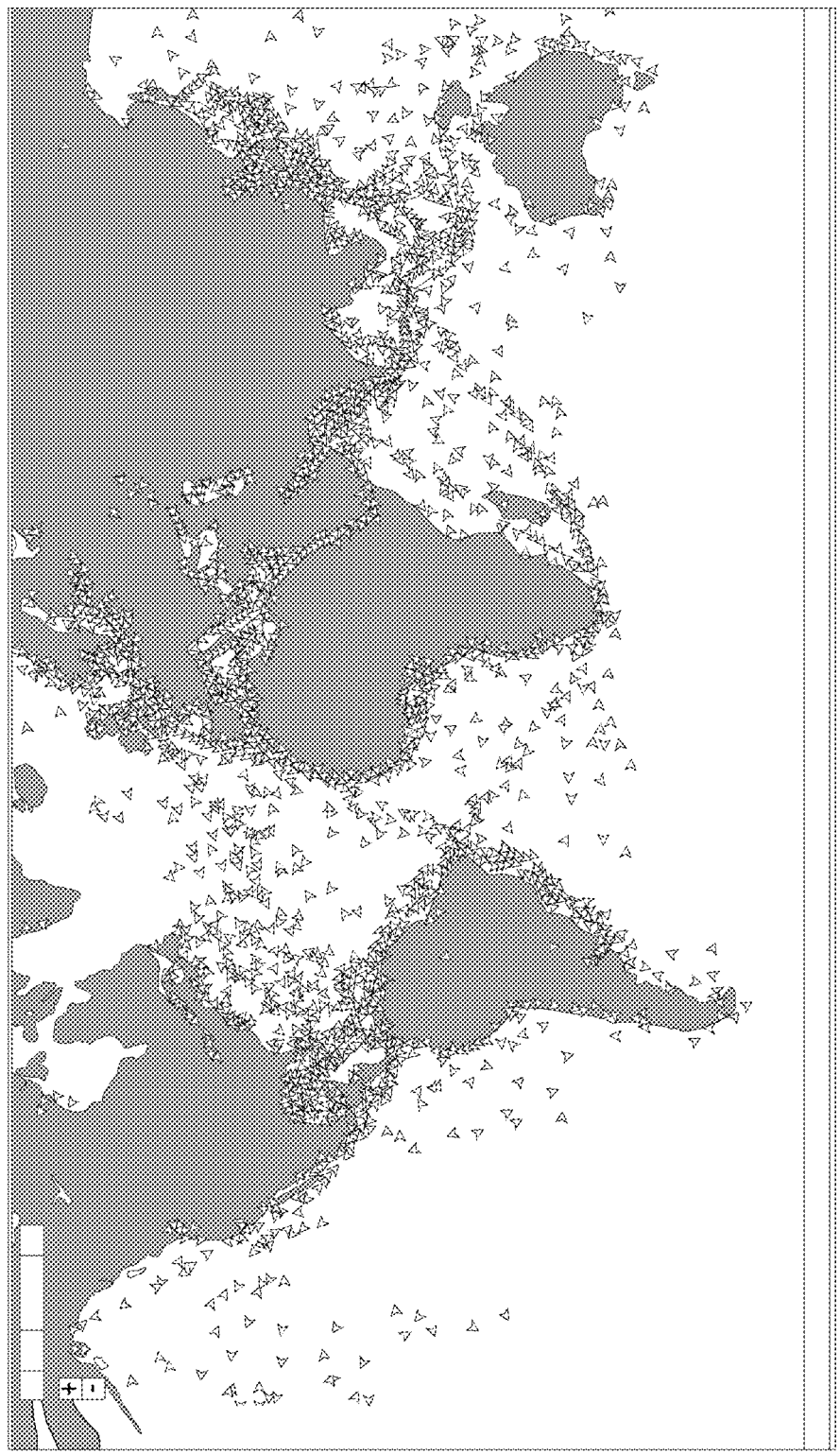
FIG. 2 is a schematic diagram of a world map having vessel data overlaid on it.

FIG. 2 shows an example of a map of the world which has vessel data overlaid upon it. The vessel data shown in FIG. 2 relates to seagoing vessels which are above a certain tonnage. The map data shown in FIG. 2 could relate to other data of interest, for example aircraft data, or meteorological data. From FIG. 2 it can be seen that when wishing to view vessel data, the positions of around 65000 vessels (at the time of writing) can be potentially included in the map view. In an example system of the prior art, each data point relating to a vessel is treated as an object and an image overlaid onto the underlying map tile that is requested. This causes substantial delays in rendering time, since each vessels position is calculated and rendered into the map data. In the context of a browser session, this places significant demands on the third-party map provider, and user experience is significantly compromised. This is because vessels are considered as objects, and the browser suffers from slower rendering times as it has to deal with more objects.

Figure 3:
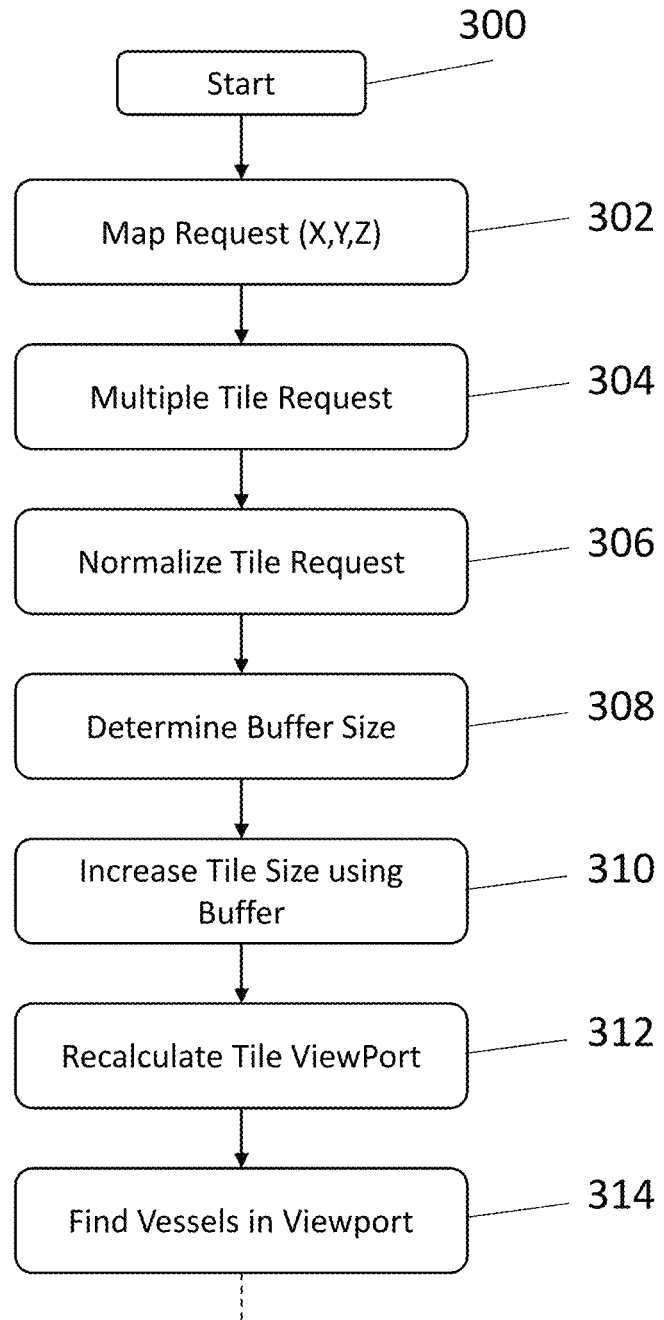
FIG. 3 is a flow diagram of a method for creating a map tile.

FIG. 3 shows a method 300 for applying object specific data to a map. The method is shown as relating specifically to vessels, although the method may equally apply to other large-scale data sets of geo-referenced data. The method may be implemented by a user of a web mapping service. At the time of writing, the most popular web mapping service is provided by Google® as the GoogleMaps® service. There are many opensource alternatives. The user may be accessing the service through a web based browser. The browser may be being operated via a computer or other computing device. The following relates to a desktop computer implementation or similar wherein a large display is used, the display being able to display multiple tiles at the same time; other embodiments are described below. At step 302, a map request is sent to a web-mapping service. The map request is based on a user request to view a portion of the world map. The user request may be created by the user open a browser session, and adjusting a map view from within browser session. The user moves the map, which for the user is just a single viewport but the map server splits that request into multiple tile requests. The user may have a user account, in which user preference settings may be configured. User preference settings include, but are not limited to: vessel type, vessel destination, cargo type, navigation status, etc. Different options are presented to the user in dependence on whether they wish to review voyage data, historical positions or to create a density map The web-mapping service is accessed through an application programming interface (API). The map request comprises a request for one or more base map tiles, in dependence on the window view in the user's browser session. The request is composed of three components (X, Y and Z). These three components need to be normalised in order to get the view port of each tile request. The normalisation is necessary to obtain the latitude and longitude boundaries of each tile. Having reference to FIG. 1, if a user wishes to view a portion the south Atlantic Ocean at zoom level 2, a tile request for tiles (1,2,2) and (2,2,2) is made.

The map request constitutes a multiple tile request (304). The tiles are requested if all or part of the tile is determined to lie within the view port of the map request. At step 306 the tile request is normalised. This is required in order to provide a viewport that is defined not in pixels, as per the map request, but rather in latitudinal and longitudinal coordinates. The bounds of the tiles which make up the map request are obtained, and the relationship between the pixel data of each tile is dependent on the projection used, and the position of the tile within the projection. In general, the Mercator projection is used, although it is possible to use different base map projections with the present method. Normalising the tile request then includes determining the southwestern-most and northeastern-most coordinates requested in the viewport defined by the user's request.

At step 308, optionally a buffer size is determined. In the case that the map request relates to the display of vessel data, an image buffer is used around the border of the tiles which make up the tile request, in order that any vessels at the edge of the view port are included, since they have a non-zero size. The size of the buffer is dependent on user preferences relating to which vessels need to be included in the viewport. Where a map request is for a wide view, the vessels may be represented with a point icon, which is not required to display directional information. Such a point may be a circle or other shape having two or more orders of rotational symmetry. Where the view requested by the user is more narrowly focussed, the vessels may be indicated by icons which display directional information indicating the heading or direction of travel of the vessel. Such an icon may include a triangle, pseudotriangle or concave kite. In some cases, the zoom level may be such that the dimensions of the vessel are shown in the viewport. The buffer size may be smaller in the case that a wide view is requested, where no directional information is required. An 8-pixel buffer may be added in this case. Where a narrower view is requested by the user (ie at a higher zoom level) a 16-pixel buffer may be added. It will be appreciated that buffers of different sizes may be used. Where a vessel is located at the edge of a tile, it may be that the icon displayed is part of multiple tiles. Calculating the buffer allows for the display of different parts of the vessel which may lie in different tiles.

The tile size to be created is increased to include the buffer as determined by the user preferences and/or zoom level in the map request (step 310). The tile request and buffer combined represent an extended viewport.

At step 312 the tile ViewPort is recalculated, including the buffer. Again, the view port is calculated to define the geographic coordinates of the corners of the view port, so as to be able to be used to determine which vessels lie within the viewport. This is done by determining the southwestern most and northeastern most points of the view port, and returning these values. The size in pixels of the viewport tile to be created is also calculated in order to be able to map pixel data to coordinate data.

Once the viewport is calculated at the correct size, and the correct geographical coordinates have been determined from the normalised pixel data, the vessel data requested from vessel data database. The vessel data request comprises a request for vessels having coordinates which lie in between the southwesternmost and northeasternmost coordinates defining the extended viewport. It is then determined for each vessel in the vessel data database if the vessel data database whether the vessel has coordinates which lie within the viewport. This can be achieved by comparing the latitude and longitude coordinate information known which provides the vessel's position to the south-westernmost coordinate and northeastern-most coordinate. In this way, only the vessels which are required to be displayed in the viewport are retrieved from the vessel data database, thus reducing the processing load on the system when compared to prior art systems in which the full dataset is requested.

Once the vessel data is found at step 314, the vessel data relating to position is translated from latitudinal and longitudinal data into pixel reference data at step 402, in order that it be placed in the correct location on the subsequent map. This is non-trivial, due to the map projection data meaning that there is a non-linear relationship between the latitudinal data and the pixel data.

The transparent map image is created at step 404. The dimensions of the transparent map image have been calculated in step 312. The transparent image, which may be a map tile, includes the requested map view, plus the buffer which was determined in step 308—namely the extended map view. In step 406 the vessels are plotted in the image. The plotting of the vessel data is done in dependence on zoom level, and user preference. Depending on the options selected by the user on the mapping interface being used, and the zoom level, either a dot, or an arrow head, or the vessel shape is drawn. For example, at a very high zoom level the vessel dimensions may be fully drawn. Where vessel dimensions are plotted, a further translation between coordinate data and pixel data is required, in the manner of that carried out in step 402. This, again is because there is not a linear relationship between latitude data and the pixel data in the image, due to the map projection used in the map image.

The process of step 406 is carried out iteratively, looping through each vessel which lies within the viewport and buffer. To create a dot an ellipsis is drawn with a gradient at the correct pixel coordinates. To draw an arrowhead, or pseudotriangle, a bitmap image is created in the desired shape, and then rotated around its centre point using the vessel's heading—data which is included in the vessel data retrieved from the vessel data database. This provides an arrowhead or other shape which displays the direction/heading information of the vessel.

The vessel data includes the length both fore and aft of the transmitter, as well as the port and starboard widths, so using these the vessel can be plotted in the correct position. A bitmap of this image is created, and rotated so that it shows the correct heading, and this is drawn onto the transparent image at the correct pixel location.

Figure 4:
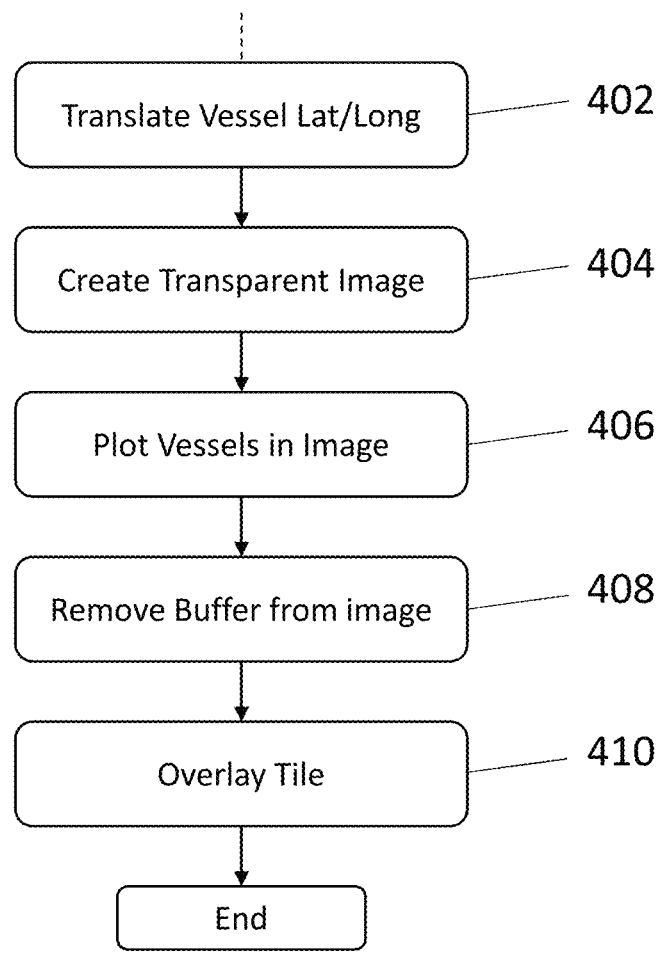
FIG. 4 is a flow diagram of a method for creating a map tile for display on a mobile device.

Once the vessels have all been added to the Map tile, the in the case that a buffer has been created, the buffer of the tile is cropped in order to return a standard size map tile. A standard size map tile may be 256×256 pixels, for example. Once the map tile has been created at the map tile server, it can be overlaid onto the third-party map data which was requested and retrieved in step 302 from the web-mapping service. The combined base map and map tile overlay are provided to the user for viewing. The combined base map data and map tile showing the vessel data are displayed at the user device.

Where a tile request is made having a viewport which crosses the international dateline (IDL), the tile request must be treated as two separate requests. This is because the global coordinate systems which describe position data run from the Greenwich meridian to plus one hundred and eighty degrees and to minus one hundred and eighty degrees. For example, a tile request which has longitude values spanning from 150 to −10 degrees needs to be treated as two separate requests, one which spans from 150 to 180 degrees, and a second which spans from −180 to −10 degrees. The check for a map tile request which crosses the IDL can be made at the outset of the process outlined in FIGS. 3 and 4.

In an embodiment, the determination of the positions of each vessel is achieved using the automatic identification system (AIS), known in the art. In the AIS, each vessel above a certain gross tonnage is required to be fitted with a tracking system, which broadcasts information relating to the identity and characteristics of the vessel, as well as data relating to its current location and movement. Such data may include the location, orientation, course, and speed of the vessel. Further information that may be included is the vessel's International Maritime Organization (IMO) number, the maritime mobile service identity (MMSI), navigation status (e.g. at anchor, under way using engine, etc.), rate of turn (e.g. right or left, 0 to 720 degrees per minute), speed over ground (typically given in knots), location data (e.g. longitude and latitude), position accuracy, course over ground (relative to true north), true heading, data relating to fuel usage (e.g. current amount of fuel, current fuel usage rate), and a time stamp. Each AIS message contains the location and time at which it was broadcast. Typically, AIS messages are automatically broadcast at regular time intervals via a transmitter on the vessel. The time interval is typically of the order of a few seconds. In embodiments using the AIS, vessels are equipped with an AIS transceiver that broadcasts the vessel information. In this way, the position of the vessel can be determined repeatedly over a period, to give a track of the vessel's position over that time. The AIS captures all ship movement and data needed to perform the method 300 can be retrieved when necessary.

The vessel data is converted into x+y pixel data on the fly since the specifics of the viewport mean that it cannot be converted in advance.

In other embodiments, the positions may be determined using the Global Positioning System (GPS) or other known geolocation techniques.

In the foregoing, the term viewport is used to mean the area of a larger base map to be represented on the screen of a user device. The user viewport in the field of rendering digital map data is the (generally rectangular) area covered by the map request. In the present case the tile viewport is the SW and NE latitude and longitude points of the tile request made to the API.

Figures 5A, 5B:
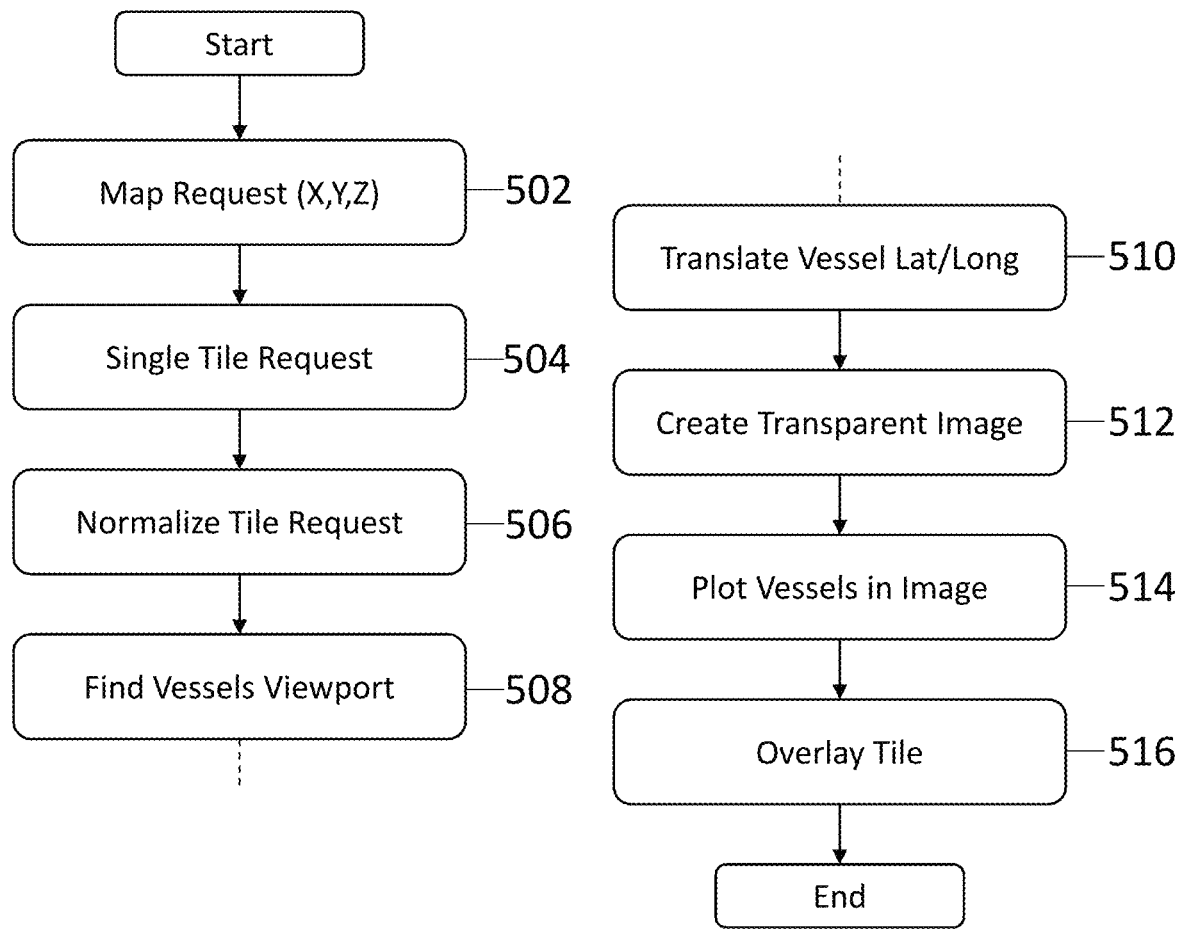
FIGS. 5a and 5b show a flow diagram of a method for creating a map tile for display on a mobile device.

FIGS. 5a and 5b show a flow chart for a method according to an embodiment of the present disclosure. The method shown in FIG. 5a is suitable to be performed where a map request comes from a portable mobile device, such as a smartphone or tablet or similar. Such devices generally comprise smaller displays and the viewport is smaller in the iOS implementation than when view in a website browser. Therefore the map request comprising X,Y,Z coordinates is a single tile request (504). The map request is made to a third-party web-based mapping provider, as described above. The tile request is normalised as described above in step 506, allowing the vessels viewport to be determined at step 508. The positional vessels data is translated into pixel data at step 510, this translation, as described above being dependent on the viewport and the projection which is being implemented in the underlying geospatial data. A transparent image is created at step 512, and the translated vessel data is plotted into the transparent image at step 514, iteratively, until all the vessels returned at step 508 have been plotted. The now complete image is overlaid onto the map data.

Figure 6:
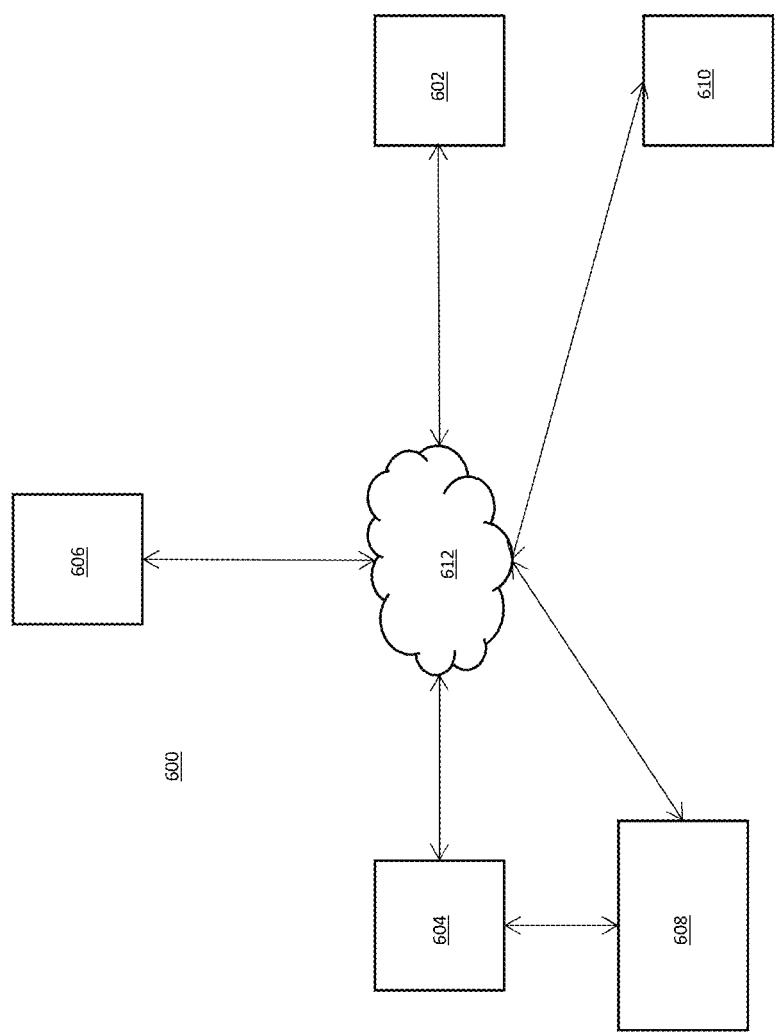
FIG. 6 shows a system for implementing a method according to the present disclosure.

FIG. 6 shows a system according to the present disclosure. It will be appreciated that individual system components may be combined into composite components. System 600 comprises a user device 602, a map tile server 604, web mapping server 606, local vessel database 608 and third-party vessel data collector 610. User device 602 is arranged to communicate with map tile server 604 and web mapping server 606 via network 612. Network 612 may be any network, such as a Local Area Network, a Wide Area Network, or the internet, for example. Map tile server 604 is in communication with vessel database 608. A user makes a map tile request using a browser interface on user device 602. User device 602 may be a computing device such as a laptop, tablet computer, desktop computer or mobile computing device such as a smart phone. The user request is received at the server 604. In response to receiving the user request the Tile server 604 makes a request from a third party map server 606. The map request includes information regarding map data which a user wishes to view on a display of the user device 602. The third party map server 606 returns the map data corresponding to the user request to user device 602. The request is normalised at the tile server 606 in the manner described above, in order to determine the global coordinates of the viewport which corresponds to the user request for map data. Vessel data database 608 stores vessel data, the vessel data containing positional information (as described above). It will be appreciated that the vessel data may relate to any geospatial data set of interest to the user.

The vessel data database is updated by data received from remote data collector 610 via network 612. Remote data collector 610 may send updates regarding individual vessels which are collected at vessel data database 608. Remote data collector 610 may be a distributed system which collects and collates data about multiple vessels from various sources. Tile server 604 requests vessel data from the vessel data database which corresponds to the viewport of the user map request. The vessel data database returns to the tile server 604 the vessel data for those vessels located in the viewport (which can include those located in the viewport buffer, where the buffer is applied. The tile server 604 then constructs a transparent image having the correct dimensions corresponding to the extended viewport of the user request. The transparent image comprises the vessel data, which is displayed according to user preferences and the zoom level of the user request. When the tile server 604 has created the transparent image and included the relevant vessel data as described above. (map tile) the optional buffer is trimmed and the transparent image is provided to the user device along with instructions that the map data retrieved from the third-party server 606 is to be displayed with the transparent image.

The vessel data may be used to create a transparent image, or map tile, as described above, which shows positional data of vessels.

Alternatively a transparent image, or map tile, showing a density map, voyage data or historical vessel data, can be created. In order to create a density map, voyage data or historical map, particular vessels are selected via their International Maritime Organisation number, and a time period is selected.

The degree of accuracy required from the positional data relating to the vessels is related to the zoom level of the user request. The total vessel positions are calculated for the list of IMO numbers and based on the zoom level. For example, where the zoom level is less than 5, two decimal places may be required; where the zoom level is between 6 and 8, three decimal places may be required, and where the zoom level is greater than or equal to 9, four decimal places may be required. The calculation of the total vessel positions for the selected vessels is then put into a data structure relating specific latitudinal and longitudinal positions to a number of times vessels have been located there in the time period specified. Once the total count per position has been calculated, the position count data may be converted into heat values. In a similar way to that described above, the tile request may be normalised so as to obtain the geographic coordinates of the map viewport. The pixel position in global coordinates of the tile boundaries is calculated, and the totals for the tile viewport are then converted into x and y pixel coordinates. The tile server may then create a new map tile which has the heatmap colour values representing density totals plotted in the correct locations. The density map tile is then suitable for overlaying onto the underlying map data which is retrieved from a third-party map server in response to the user map request.

Figure 7:
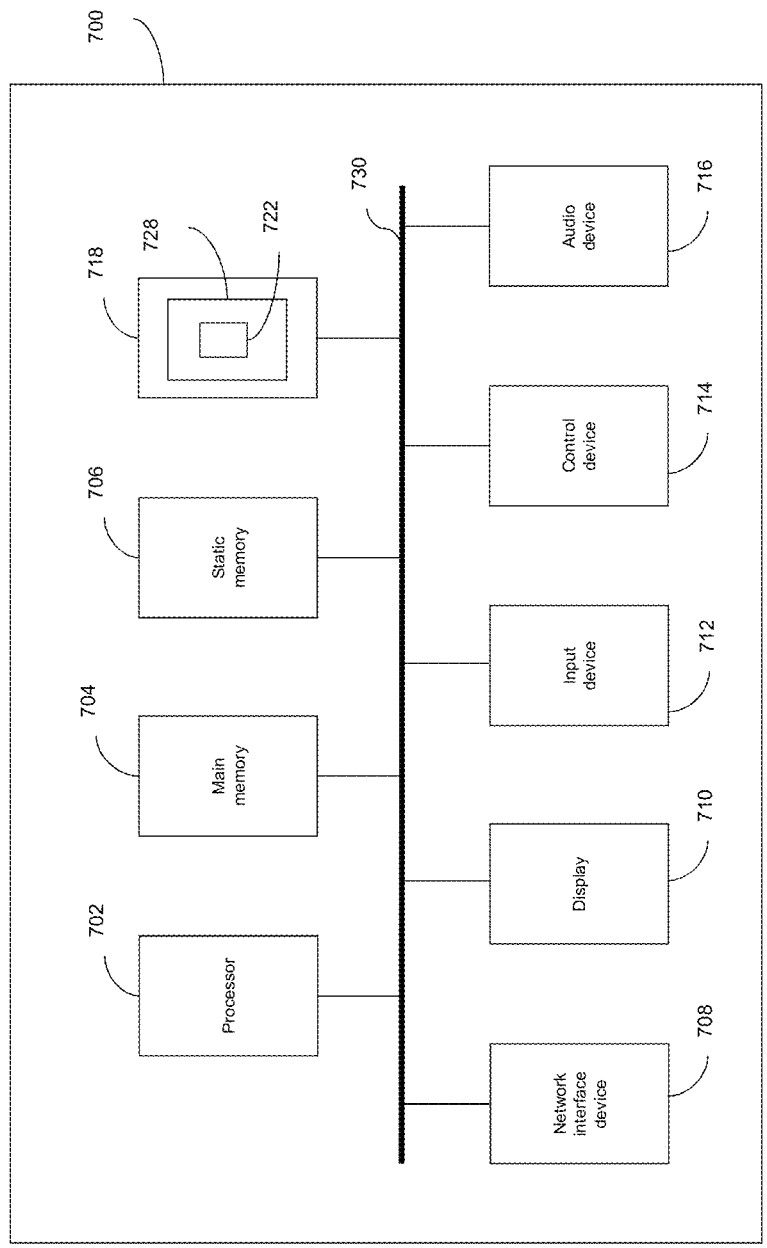
FIG. 7 is a block diagram of a computing device for performing the disclosed methods.

The methods discussed above can be performed on a computing device located, for example, on a vessel or on land. FIG. 7 illustrates a block diagram of one implementation of a computing device 700 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory (e.g., a data storage device 718), which communicate with each other via a bus 730.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 722) for performing the operations and steps discussed herein.

The computing device 700 may further include a network interface device 708. The computing device 700 also may include a video display unit 710 (e.g., a liquid crystal display (LCD) or a cathode ray tube (CRT)), an alphanumeric input device 712 (e.g., a keyboard or touchscreen), a cursor control device 714 (e.g., a mouse or touchscreen), and an audio device 716 (e.g., a speaker).

The data storage device 718 may include one or more machine-readable storage media (or more specifically one or more non-transitory computer-readable storage media) 728 on which is stored one or more sets of instructions 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining," "identifying," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method, comprising,
receiving a user request for map information at a server;
requesting a map tile from a remote server based on the user request,
the map tile request including zoom level information and tile position information;
at the server, normalizing the map tile request based on the zoom information and the tile position information,
wherein normalizing the map tile request comprises converting the zoom information and the tile position information into global coordinates;
defining a map view area based on the normalized request,
obtaining vessel data relating to a plurality of seagoing vessels;
determining for each of the plurality of seagoing vessels if the seagoing vessel lies within the map view area;
creating a new map tile comprising the vessel data for the seagoing vessels determined to lie within the map view area; and
causing display of the user requested base map tiles and overlaying the new map tile at a user device.

2. The method of claim 1, wherein defining a map view area further comprises providing the map view with an image buffer to create an extended map area.

3. The method of claim 2, further comprising determining for each of the plurality of seagoing vessels if the seagoing vessel lies within the extended map area, and wherein the step of creating the new map tile includes vessel data for the seagoing vessels lying in the extended map area.

4. The method of claim 2, further comprising removing the image buffer prior to causing display of the new map tile at the user device.

5. The method of claim 2, further comprising, for the seagoing vessels determined to lie within the extended map area, normalizing the respective vessel data to conform to the normalized request, and wherein the new map tile is created based on the normalized vessel data.

6. The method of claim 5, wherein normalizing the vessel data comprises converting latitude and longitude information to pixel data.

7. The method of claim 2, wherein the image buffer is based on the largest seagoing vessel in the map view.

8. The method of claim 2, wherein the image buffer is based on the zoom level.

9. The method of claim 1, wherein determining if a seagoing vessel lies in the map area includes converting coordinate information into pixel information.

10. The method of claim 9, wherein the vessel data comprises latitude and longitude information, the method further comprising normalizing the latitude and longitude information to correspond with the normalized base map tile data.

11. The method of claim 1, wherein the vessel data comprises automatic identification system (AIS) data.

12. The method of claim 1, wherein normalizing the request comprises converting zoom information and tile position information into world coordinates.

13. The method of claim 1, wherein the vessel data comprises coordinate information.

14. A computer readable non-transitory medium comprising computer-executable instructions which, when executed by a first server, cause the first server to perform a method comprising:
responsive to receiving a user request for map information at the first server, requesting a map tile from a remote server based on the user request,
the map tile request including zoom level information and tile position information;
at the first server, normalizing the map tile request based on the zoom information and the tile position information,
wherein normalizing the map tile request comprises converting zoom information and tile position information into world coordinates;
defining a map view area based on the normalized request,
obtaining vessel data relating to a plurality of seagoing vessels;
determining for each of the plurality of seagoing vessels if the seagoing vessel lies within the map view area;
creating a new map tile comprising the vessel data for the seagoing vessels determined to lie within the map view area; and
causing display of the user requested base map tiles and overlaying the new map tile at a user device.

15. A first server configured to perform a method comprising:
responsive to receiving a user request for map information at the first server, requesting, by one or more processors of the first server, a map tile from a remote server based on the user request,
the map tile request including zoom level information and tile position information;
at the first server, normalizing, by the one or more processors of the first server, the map tile request based on the zoom information and the tile position information,
wherein normalizing the map tile request comprises converting zoom information and tile position information into world coordinates;
defining, by the one or more processors of the first server, a map view area based on the normalized request,
obtaining, by the one or more processors of the first server, vessel data relating to a plurality of seagoing vessels;
determining, by the one or more processors of the first server, for each of the plurality of seagoing vessels if the seagoing vessel lies within the map view area;
creating, by the one or more processors of the first server, a new map tile comprising the vessel data for the seagoing vessels determined to lie within the map view area; and causing, by the one or more processors of the first server, display of the user requested base map tiles and overlaying the new map tile at a user device.

\* \* \* \* \*